Patented Nov. 14, 1944

2,362,478

UNITED STATES PATENT OFFICE 2,362,478

REAGENT FOR TESTING FOR ACETONE

Alexander Galat, New York, N. Y., assignor to The Denver Chemical Manufacturing Company, New York, N. Y., a corporation of Colorado No Drawing. Application December 24, 1941, Serial No. 424,303

9 Claims. (Cl. 23—230)

My present invention relates to reagents for testing and approximately quantitatively determining the presence of acetone in solution. More specifically, it relates to such reagent which, in making the test for acetone, requires no special equipment, no technical skill or chemical knowledge, no exact measurement of quantities or dilution of the reactants with water, no shaking of the substances brought into reacting relation, and which, on the whole provides an exceedingly simple, rapid and convenient means for instantaneously approximating the amount of acetone present.

The formation of acetone in the body and its excretion in the urine result from incomplete oxidation of fatty acids. The oxidation of fatty acids requires a normal functioning of carbohydrate metabolism and, when this is disturbed, fatty acids give rise to acetone bodies. The detection of acetone in the urine is therefore diagnostically important as it indicates a deficient carbohydrate metabolism, and provides a more certain test for diabetes than does testing for sugar in urine.

In recent years, there has been a tendency to regard the presence of acetone bodies in the urine of a diabetic patient as being even more significant than the presence of sugar. It was observed that if the diabetic patient is made to utilize a quantity of carbohydrate essential for his particular metabolic needs the excess may be excreted without damaging results, provided the urine is acetone-free. Should acetone be present, insulin is given until this acetone disappears. With such treatment the patient feels well, maintains his weight and is free of any symptoms of diabetes, though he may be excreting very large amounts of excess sugar (sometimes as much as 150 grams daily).

Heretofore many reagents have been devised and used in hospitals, by clinicians and by physicians for testing for the presence of acetone in urine. These have included wet and dry reagents but so far as I am aware those which have been proposed for determining the presence of acetone in urine have required one or more of the following procedural steps: the careful measurement of reagents and the use of test tubes and/or the dilution with water and vigorous shaking of the urin-water-reagent mixture. The reagents have been highly poisonous and the test required considerable time, often as much as ten minutes where small amounts of acetone were present. Experience and technical skill were also required to properly perform the test. In other words, the reagents heretofore provided were such as could not ordinarily be used by the layman, and particularly by diabetics and those persons who periodically desire to test their own or another's urine as a check upon the physiological functioning of their own or another's human economy.

According to my present invention I provide a test for acetone, which test requires no equipment, except a dropper; no exact measurement of the urine, no dilution of the urine with water, no shaking, and which test is practically instantaneous. The technique is identical with that in testing for sugar in urine, described in my prior United States Patent No. 2,210,579. The reagent is a dry powder, a small amount of which when brought into contact with one drop of urine containing acetone gives an instantaneous color reaction. In making a test about 0.2 gram of the reagent is deposited in a small mound on a piece of white paper or the like and one drop (about .05 cc.) of urine is added. Depending upon the amount of acetone present, colored reaction products are formed which range from various shades of green to violet and blue.

The reagent which I employ consists of sodium carbonate (anhydrous granular), ammonium sulfate (anhydrous granular), and sodium nitroprusside (anhydrous powder) admixed to provide various percentage compositions.

The mechanism of the test reaction is thought to be as follows: When the drop of urine moistens the reagent, the sodium carbonate and ammonium sulfate react to produce ammonium carbonate, which in turn hydrolyses to carbon dioxide and ammonia. In the presence of ammonia, acetone reacts with sodium nitroprusside producing a colored compound of, as yet, unknown composition. The amount of urine added (one drop) being insufficient to dissolve all of the sodium carbonate and ammonium sulfate present, the undissolved particles of the latter which are white, act to cause the observed color to be that due to the reflected light. Moreover the amount of solids (approximately 0.2 gram) being four times as great as the amount of liquid (one drop, approximately 0.05 cc.) and also because of the reaction of anhydrous sodium carbonate with water of the urine, which leads to crystalline $Na_2CO_3.10H_2O$, the test mass remains substantially dry. This prevents sedimentation of insoluble matter and makes the color sharp and even.

The reaction in this test requires only a few seconds which by far is much quicker than any previously known tests for acetone.

The preferred composition of the reagent is:

| | Percent |
|---|---|
| Sodium carbonate (anhydrous, granular) | 49.5 |
| Ammonium sulfate (anhydrous, granular) | 49.5 |
| Soduim nitroprusside (anhydrous, powder) | 1.0 |

This composition has been arrived at after testing thousands of hospital specimens of urine with various proportions of these component compounds. It is sufficiently sensitive to detect traces of acetone, yet it does not produce too strong a color, hence it affords comparison of colors for making an approximately quantitative test. Although this composition is the preferred one, I have obtained satisfactory results with compositions containing up to 5% of sodium nitroprusside and in which compositions the amounts of sodium carbonate and ammonium sulfate were approximately equal. Other soluble nitroprussides may be substituted for the sodium nitroprusside in the reagent.

The procedure for carrying out a quantitative test is as follows: Measure out approximately 0.2 gram of the reagengt in any manner, such for example with a measuring spoon, and place it on a piece of white paper or the like in a small mound. Deposit onto this mound one drop of urine, using a special dropper giving uniform drops of 0.05 cc. each. The reaction takes place immediately and the resulting color, if acetone is present, deepen with time, wherefore it is desirable to compare the color within one minute after making the test. By comparing the color of the reaction product with a prepared color chart on which definite colors correspond to conventional designations as respects the acetone content as indicated in the table below, an approximate estimate of the acetone content of the urine can be quickly obtained.

| Color: | Conventional designation |
|---|---|
| Light green | Trace |
| Light violet | 1+ |
| Medium violet | 2+ |
| Deep violet | 3+ |
| Dark purple-blue | 4+ |

The stability of the reagent has been extensively tested and I have found there is no deterioration even when the reagent is exposed to air for a period of months. Light, however, produces some decomposition of soluble nitroprussides and the reagent is therefore best kept in brown glass vials or the like.

From the foregoing description it will be apparent that I have by the present invention provided a cheap, simple and convenient reagent for testing for acetone in urine, which test may be either qualitative or approximately quantitative depending upon the composition of the reagent. It will also be apparent that the test is reliable and of a character such that it can be made within a minute or less by an unskilled person since no test tubes or other laboratory equipment is necessary, except a dropper and possibly a measuring spoon or the like.

What I claim is:

1. A reagent which, when a drop of solution containing acetone is applied thereto, will give a color reaction observable by reflected light, said reagent consisting of a dry mixture of a powdered anhydrous soluble nitroprusside, granular anhydrous sodium carbonate and granular anhydrous ammonium sulfate.

2. A reagent which, when a drop of solution containing acetone is applied thereto, will give a color reaction observable by reflected light, said reagent consisting of a dry mixture of powdered anhydrous sodium nitroprusside, granular anhydrous sodium carbonate and granular anhydrous ammonium sulfate.

3. A dry reagent which, when a drop of solution containing acetone is applied thereto, will give a color reaction observable by reflected light, said reagent consisting of substantially equal amounts by weight of granular anhydrous sodium carbonate and granular anhydrous ammonium sulfate and a relatively small amount of a powdered anhydrous soluble nitroprusside, the combined weight of the soduim carbonate and the ammonium sulfate to the nitroprusside being at least 19 to 1.

4. A dry reagent which, when a drop of solution containing acetone is applied thereto, will give a color reaction observable by reflected light, said reagent consisting of:

| | Percent |
|---|---|
| Powdered anhydrous sodium nitroprusside | 1.0 |
| Granular anhydrous sodium carbonate | 49.5 |
| Granular anhydrous ammonium sulfate | 49.5 |

5. A dry reagent for testing urine for acetone, said reagent being adapted in measured quantity to react to a measured drop of urine upon being brought into direct contact and substantially instantaneously give different colored reaction products observable by reflected light depending upon the amount of acetone present, and from which colored reaction product observed by reflected light the amount of acetone present can be estimated, said reagent consisting of a dry mixture of granular anhydrous sodium carbonate, granular anhydrous ammonium sulfate and powdered anhydrous sodium nitroprusside.

6. A method of testing urine for acetone which consists in applying one drop of the urine to be tested to a reagent consisting of a dry mixture of granular anhydrous sodium carbonate, granular anhydrous ammonium sulfate and a powdered anhydrous soluble nitroprusside.

7. A method of testing urine for acetone which consists in applying one drop of the urine to be tested to a reagent consisting of a dry mixture of granular anhydrous sodium carbonate, granular anhydrous ammonium sulafte and powdered anhydrous sodium nitroprusside.

8. A method for the approximate quantitative estimation of acetone in urine which consists in applying a drop of the urine to be tested to a small measured quantity of a dry mixture of granular anhydrous sodium carbonate, granular anhydrous ammonium sulfate and powdered anhydrous sodium nitroprusside and comparing the color of the resulting substantially dry reaction products with a color chart whereon the colors indicate various amounts of acetone present in the urine.

9. A method for the approximate quantitative estimation of acetone in urine which consists in applying a drop, approximately 0.05 cc., of the urine to be tested to a small measured quantity, approximately 0.2 gr., of a dry mixture of granular anhydrous sodium carbonate, granular anhydrous ammonium sulfate and powdered anhydrous sodium nitroprusside disposed in the form of a small mound on a white background and comparing the color of the resulting reaction products with a color chart whereon the colors indicate various amounts of acetone present in the urine.

ALEXANDER GALAT.